United States Patent

Howell

[11] 4,098,034
[45] Jul. 4, 1978

[54] BUILDING SWAY CONTROL

[76] Inventor: Wallace E. Howell, R.F.D. 3 Box 400, Golden, Colo. 80401

[21] Appl. No.: 683,661

[22] Filed: May 6, 1976

[51] Int. Cl.² .............................................. E04B 1/34
[52] U.S. Cl. ...................................................... 52/1
[58] Field of Search ............... 115/1 C; 244/50, 24, 244/26, 92, 91, 76 R, 76 B, 76 C; 52/173, 1, 83; 104/113; 98/2.14; 73/147, 194; 188/1 B, 1 R

[56] References Cited

U.S. PATENT DOCUMENTS

| | | | |
|---|---|---|---|
| 1,637,133 | 7/1927 | Tew | 244/92 |
| 1,763,590 | 6/1930 | Klemperer | 244/76 C |
| 1,806,316 | 5/1931 | Thayer | 244/24 |
| 2,270,537 | 1/1942 | Ludington | 52/173 |
| 2,369,652 | 2/1945 | Avery | 244/76 R |
| 2,955,781 | 10/1960 | Hammell | 244/76 R |
| 2,962,243 | 11/1960 | Coleman et al. | 244/76 C |
| 2,985,409 | 5/1961 | Atwood | 244/76 C |
| 3,500,784 | 3/1970 | Reynolds | 115/1 C |
| 3,515,361 | 6/1970 | Blackburn | 244/76 R |

OTHER PUBLICATIONS

Civil Engineering, Dec. 1968, p. 63.

*Primary Examiner*—John E. Murtagh
*Attorney, Agent, or Firm*—Richard L. Stevens

[57] ABSTRACT

A plurality of movable vanes are secured to the top of a structure such as a tall building. A fan to create an independent air stream is disposed within the building. The air stream flows across the surfaces of the vanes. When the building is moved, such as by the wind, this motion is sensed. In response to this movement, the vanes are orientated whereby a thrust force of reaction opposes the motion of the building.

13 Claims, 13 Drawing Figures

BUILDING SWAY CONTROL

BACKGROUND OF THE INVENTION

This invention relates generally to an apparatus and method for counteracting the swaying and twisting motion of tall buildings exposed to the wind. It has application also to counteracting wind-excited swaying or twisting motion in other structures and apparatus wherever it may be a problem, such as the swaying of cablecars.

Swaying and twisting of tall buildings in the wind has proven to be a problem in some instances. For example, the New England Merchants Bank Building at 28 State Street, Boston, is known to have swayed enough in even moderate windstorms to cause annoyance and distress to persons working in the building and to cause superficial damage to internal walls. The troubles of the Hancock Tower at John Hancock Place, Boston, with regard to wind sway are also a well-known matter of concern.

Nearly all of the swaying and twisting motion of such buildings occurs at the fundamental frequency of vibration. Typical buildings have three fundamental frequencies corresponding respectively to sway along one axis, sway along the other axis, and twisting. In most buildings, these three frequencies are nearly identical. For example, the frequencies measured for the New England Merchants Bank Building are 0.173 Hz for eastwest sway, 0.197 Hz for north-south sway, and 0.206 Hz for twisting motion. Under these circumstances, motion in any one of these modes may be rather quickly shared with the other modes, so that the building undergoes a complex of swaying and twisting motions regardless of the direction of the exciting force.

Conventional means of dealing with the problem of such motions include structural stiffening of the building, static damping, and dynamic damping. Stiffening the building increases the force necessary to produce a given deflection and also increases the fundamental frequency of oscillation of the building, removing this frequency further from the frequency that, at typical wind speeds, contains the greatest magnitude of periodic exciting force exerted on the building, and thus reducing the amplitude of the periodic component of the wind force that is in tune with the fundamental frequency of the building. Static damping is a measure of the power absorbed from motion of the building by all the frictional losses within the building and, in a typical instance, reduces the amplitude of motion by one-half in a period of twenty seconds or so.

Dynamic damping involves transferring the momentum of the swaying motion from the building itself to some sort of counterweight attached to it, the counterweight being driven by hydraulic cylinders or other similar devices in such a way that it does work on the building opposing that done by the wind. It is the negative counterpart of a child "pumping" a swing. The weight of such a dynamic damper mass, which may be as much as 300 tons, and the powerful means required to transfer the necessary forces to it, render it a less than fully satisfactory solution to the problem.

SUMMARY OF THE INVENTION

My invention broadly provides a method and apparatus for counteracting the swaying or twisting motion of buildings or other structures without the use of a massive dynamic damper or of structural means of increasing the static damping of a building. Stated briefly in principle, the method of my invention is the transference of the momentum of the building's swaying or twisting motion to the atmosphere. This may be accomplished either by providing a directable movement of air, for example, the output of a large fan, in such a manner that the thrust force of reaction opposes the motion of the building, or by presenting a large adjustable surface (hereinafter called a sail) to the natural wind, the sail so devised and arranged that the resistance offered to the wind may be varied in such a manner as to generate a periodic component of force opposing the periodic motion of the building.

The method of my invention broadly comprises sensing the motion of a building or other structure and exchanging momentum between the building and the atmosphere in a variable manner. This exchange is preferably accomplished by deflecting a movement of air to generate a reactive force which opposes the motion of the building.

In one embodiment, a directable movement of air is provided such as by a fan in combination with controllable surfaces, such as vanes. The vanes deflect the movement of air from the fan in the direction of the momentary motion of the building and provide a reactive thrust which opposes the motion of the building. The motion of the building is sensed such as by accelerometers which determine the direction of movement, and suitable controls govern the movement of the vanes in response to the information generated by the accelerometers.

In another embodiment of the invention, controllable surfaces, such as adjustable vanes, are disposed substantially normal to the flow of the wind. The motion of the building is sensed and the vanes adjusted to generate forces that from moment to moment oppose the motion of the building. In a further embodiment of the invention, these adjustable surfaces may be employed with the combination of the directable movement of air and the controllable surfaces. These above-described concepts may also be applied to inhibit motion in smaller structures, such as cable cars or the like.

In a further aspect of the invention, dynamic tuning is achieved by the use of suitably disposed weights. At least three weights are provided and so arranged that the twisting motion of a building is minimized through this improved dynamic damping.

Figure 1:
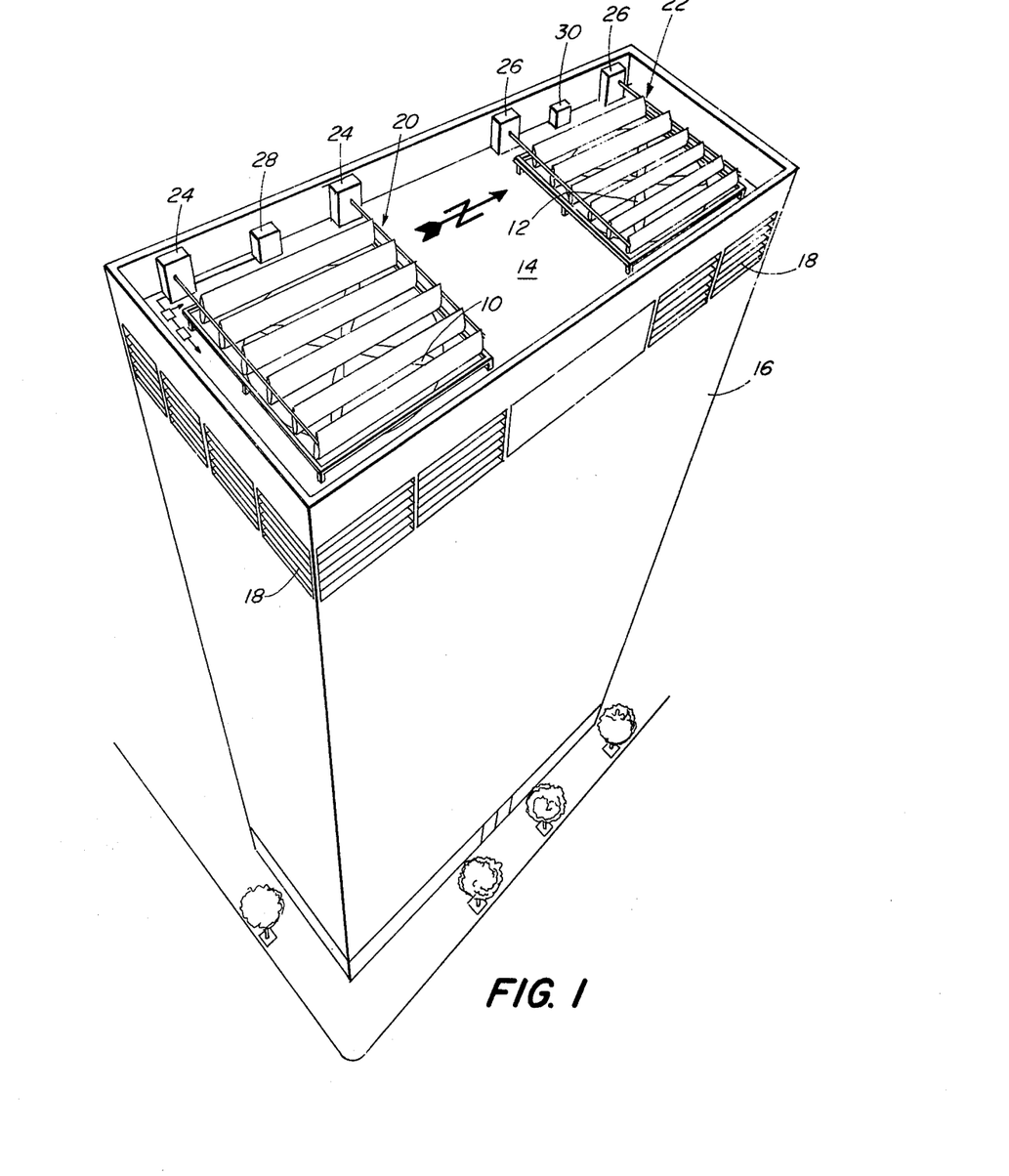
FIG. 1 is a perspective view of an embodiment of the invention used with a tall building.

A preferred embodiment of the method of my invention is illustrated in FIG. 1. Two large air-conditioning fans 10 and 12 of conventional form are disposed in the roof 14 of a slab-form tall building 16, one fan at each end of the oblong roof 14. The fans 10 and 12 draw air in through louvers 18 in the sides of the building 16 near its top and in normal use discharge the air after passage through heat exchangers (not shown) directly upward. Immediately above each of the fans 10 and 12 are disposed one or more sets of movable vanes 20 and 22.

Actuator assemblies 24 and 26 are disposed on the roof 14 and are adapted to control the movement of the sets of vanes 20 and 22 respectively as will be described. The actuators are responsive to control units 28 and 30 which in turn are responsive to sensors such as accelerometers which sense the motion of the building. In the case of basic sinusoidal swaying motion, the control unit controls the position of the vanes from moment to moment in such a manner as to direct the movement of air in the same direction as the instantaneous motion of the building, thus generating a reactive thrust that opposes the motion of the building. When the building is undergoing a complex of swaying and twisting motions, the accelerations of the two ends of the oblong roof will in general not be in phase with each other, and the thrust forces generated by the two sets of vanes 10 and 12 will each oppose the local motion of its end of the roof, thus tending to oppose the twisting motion of the building as a whole, as well as the swaying motion.

A second set of vanes similar to those illustrated in FIG. 1 may be added above the first set, the second set being oriented at right angles to the first so as to direct the movement of air to or fro along the longer dimension of the oblong roof, governed by a third control unit, thereby tending to oppose the component of the building's swaying motion along this direction.

Figure 2:
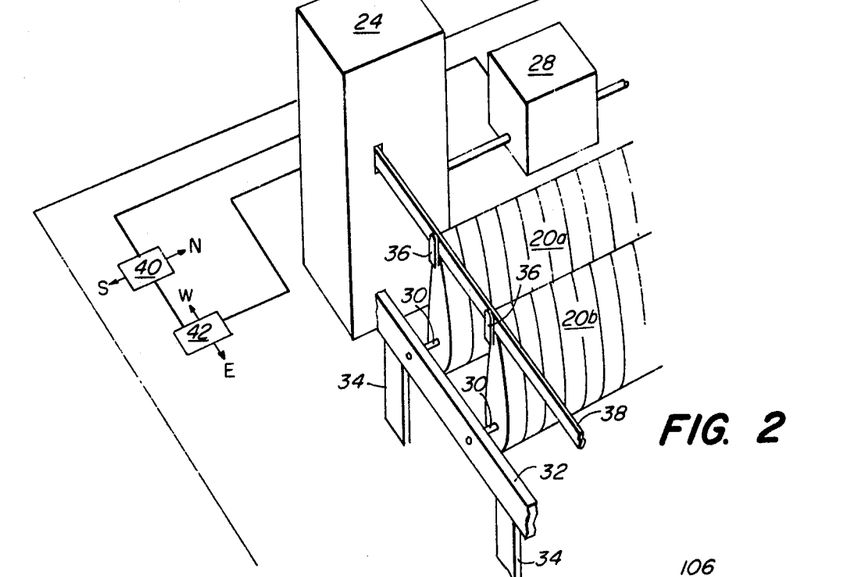
FIG. 2 is a perspective view of the vane assembly shown in FIG. 1.

FIG. 2 illustrates a preferred form of mounting and control for the multiplicity of vanes 20 comprising the set, of which only two vanes are shown for the sake of clarity. Each vane 20a, 20b, etc., includes an extending pin 30 at the lower portion thereof (only one side shown) which is journaled to a horizontal member 32 supported by legs 34. Push rods 36 are secured to the upper ends of the vanes and are pinned to a control member 38. The vanes are thus mounted such that the axis through the pins 30 corresponds more or less with the chordwise position of the center of pressure of the vane when the vane is tilted a small degree from the vertical. The trailing edges of the vanes (or the leading edges, or both) are connected to each other and to the control member 38 in the same manner as a conventional jalousie. The actuator assembly 24 comprises a double acting hydraulic cylinder and hydraulic valves connected to an appropriate source of hydraulic fluid (not shown). An identical control unit 24 situated at the other end of the vanes is also preferred.

The control member 38 is driven by the double-acting hydraulic cylinder. The hydraulic valves are actuated by the control unit 28 which is responsive to accelerometers 40,42. The accelerometers, such as a Systron Donner "Milli-G" Model 4310 Servo Accelerometer, are positioned to sense the motion of the building. Actuator assemblies 26 are identical to assemblies 24 and are responsive to control unit 30. Accelerometers 40 and 42 provide the input to the control unit 28. Conventional hydraulic pistons and valves are used and are therefore not shown in detail.

Accelerometers 40 and 42 are shown disposed in the southwest corner of the roof 14. Accelerometers for the vanes 22 are shown disposed in the northwest corner. In practice, they may be disposed in any manner such that the two pairs are near opposite ends of the oblong 14 of the roof. The control units 28 and 30 are signal processors which provide signals to the actuator assemblies 24,26. The signal characteristic determines, by controlling the actuators, the direction and amount of movement of the vanes.

Figure 3:
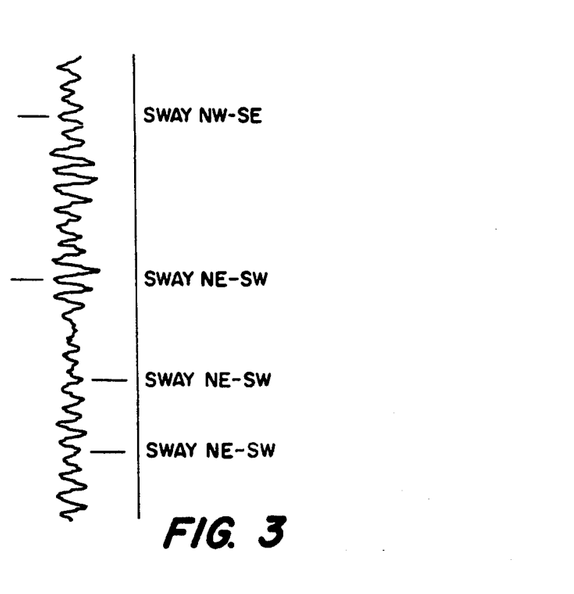
FIG. 3 is a periodogram of the motion a typical tall building would experience.

In FIG. 3, a typical recording from the output of one of the accelerometers shows the highly periodic nature of the swaying motion of a building. A recording of all four outputs from the accelerometers 40, 42 would show in the form of relative phase shifts the changes from swaying to twisting and racking motion (by racking motion is meant deformation of the normally rectangular shape of the upper floors into parellelograms with the corners slightly out of square), and illustrate the exchange of momentum among these different modes taking place within the period of a few cycles.

Figure 4:
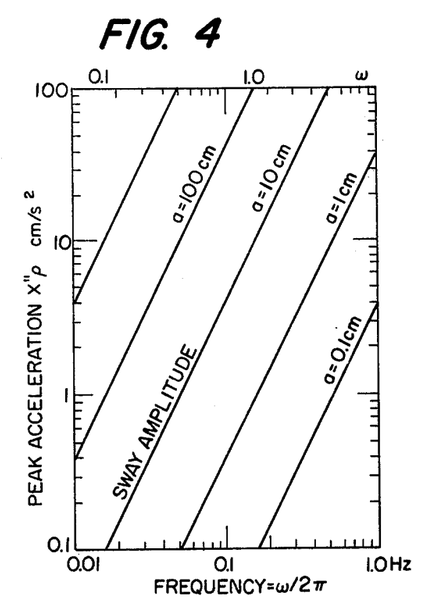
FIG. 4 is a graphical representation of sway amplitude as a function of frequency and acceleration.

FIG. 4 is a graphical solution of the equation of simple harmonic motion, showing how the amplitude of swaying motion of the building is related to the measured values of frequency and peak acceleration.

At any instant when the building 16 (or a part of it) is in motion, work may be done to oppose the sway by exerting a force in the direction opposite to the motion. In a dynamic damping system of the conventional sort, using counterweights, this effect is achieved by using hydraulic pistons to push against a counterweight as the building moves, thus exerting a counterthrust against the building in the desired direction and causing the counterweight to accelerate in the direction of the building's instantaneous motion; a half-cycle later, the thrust is reversed as the building moves in the opposite direction, and the counterweight is then accelerated in the direction opposite to the first-mentioned one. This method has the disadvantage that the product of the mass of the counterweight and the length of the track along which it moves under the action of the hydraulic piston is large and the apparatus is thereby rendered cumbersome, expensive, and heavy, usually requiring special structural reinforcement to the building in order to support the weight, and occupying valuable space.

In this embodiment, referring to FIG. 4, when the movement of greatest amplitude of sway is sensed by the accelerometer (a peak value of acceleration followed by a decline in this value) a signal is transmitted to the hydraulic valves, which actuates the pistons and causes the vanes to tilt so that they throw the stream of air from the fans in the same direction as the then motion of the building, so that the reactive force is exerted in the direction opposing the building's motion.

The following description will be in reference to the vanes 20 disposed on the south portion of the roof 14 of the building 16.

More particularly, if the sway of the building 16 is about 5 cm. in an east-west direction (FIG. 1), then accelerometer 42 (FIG. 2) would sense the motion. A signal is provided to control unit 28. More particularly, the signal provided immediately after the building had reached the limit of its westward excursion and started moving eastward would be a positive one and would cause the hydraulic apparatus in the control units 24 to move the control members 38 eastward, thus causing the vanes 20a, 20b, etc., to deflect the air eastward and generating a westward-direction reactive force.

Measurement of the damping of the harmonic motion of a building permits computation of the frictional forces within the structure of the building 16 that tend to dissipate the energy of its motion. For the sway amplitude of 5 cm. (about 2 in.), the corresponding friction force in the building 16 amounts to about 84 tons-force, the mass of the building being about 30,000 tons-mass.

Figure 5:
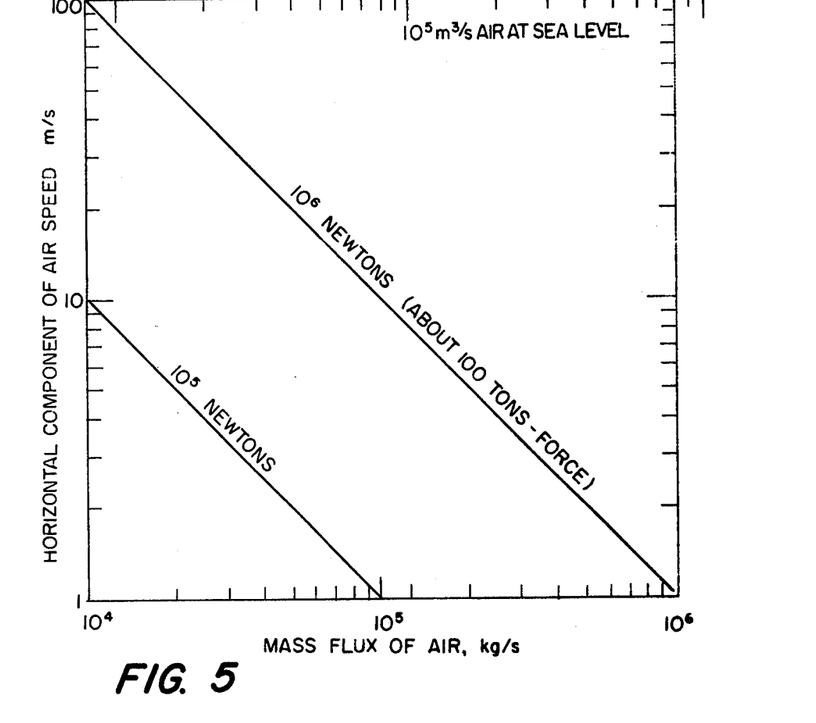
FIG. 5 is a graphical representation of the momentum equation.

FIG. 5 presents a graphical solution of the momentum equation relating the force generated by the method of my invention with the rate of mass flux of air through the fans and the velocity component given by the vanes 20 to the air in the horizontal direction of motion of the building. It shows, for instance, that imparting a horizontal velocity component of 20 m/s by deflecting the vanes 20 into the airstream from the propeller 10 flowing at the mass-flux rate of 50,000 kg/s (about 40,000 m$^3$/s at standard pressure and temperature), a thrust force of reaction of 10$^6$ Newtons (about 100 tons-force) is generated. The same relationship holds for the sail concept described below, the pertinent velocity and flux rate being the amount by which the natural wind is slowed down and the flux rate of the windstream thus slowed.

It should be noted that colocation of a pair of accelerometers with a pair of crossed vanes over a vertically pointing fan permits a force to be generated that opposes at each instant the local motion of the building at that point. Hence an installation consisting of a fan and set of vanes at each end of an oblong roof permits forces to be exerted that at any given instant oppose a swaying motion in either direction or a twisting motion, or a combination of both, thereby absorbing energy from the building whatever may be the mode of motion or combination of modes prevailing at the moment.

The following alternative embodiment employs the same basic concepts as just described but with different mechanical arrangement for achieving the same results. Similar sensors and actuator assemblies are employed as described, but the descriptions are not repeated in detail.

Figure 6:
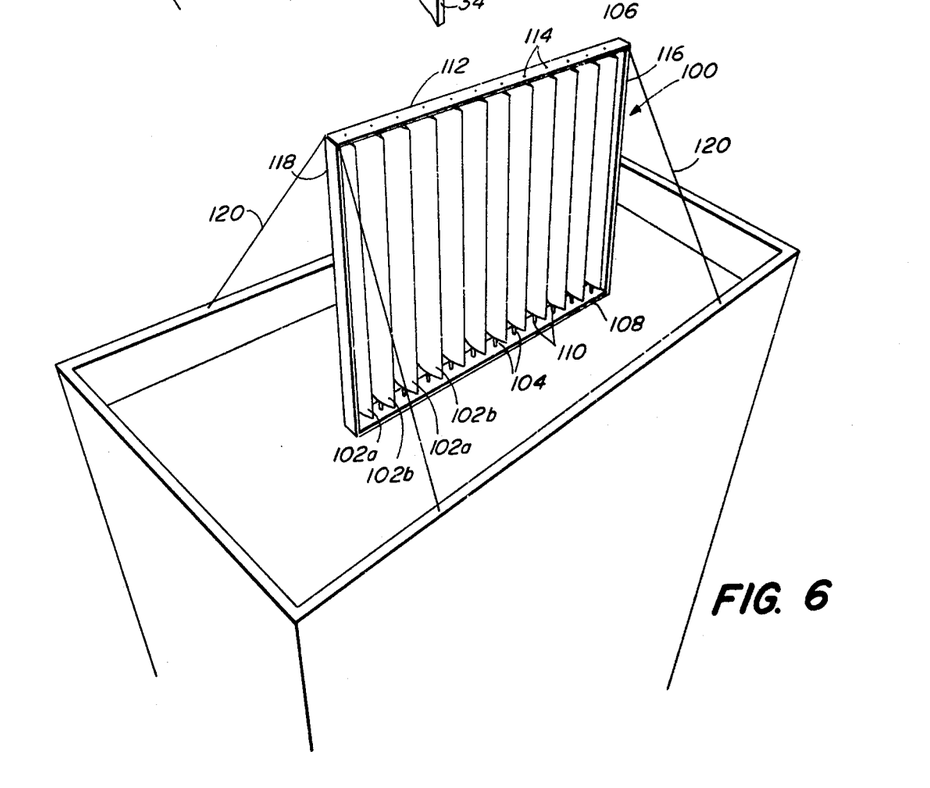
FIG. 6 is a perspective view of an alternate embodiment of the invention.

An alternative embodiment of the method of any invention is illustrated in FIG. 6. It shows a large adjustable surface or sail 100 composed of an array of alternating vertically oriented vanes 102a and 102b so disposed and controlled as to allow variation of the forces exerted by the wind on the sail, both along the direction normal to the surface of the sail and along the horizontal direction that lies in the surface of the sail.

The lower ends of the vanes 102 include an extending pin 104 and the upper ends include pins 106. A lower support plate 108 having a plurality of bearings 110 is secured to the roof. The pins 104 of the vanes 102 are received in the bearings 110 in a rotatable manner. An upper support plate 112 having a plurality of bearings 114 is secured to the side members 116 and 118. The upper and lower support plates 108 and 112 and the side members 116 and 118 define a rectangular frame, which frame is secured in an upright position by stays 120.

Figure 7A:
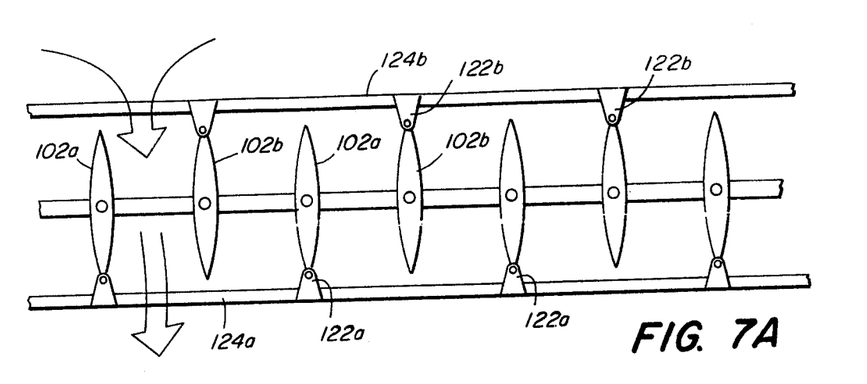
FIGS. 7a–7c are plan views of a sail employed in FIG. 6.
Figure 7B:
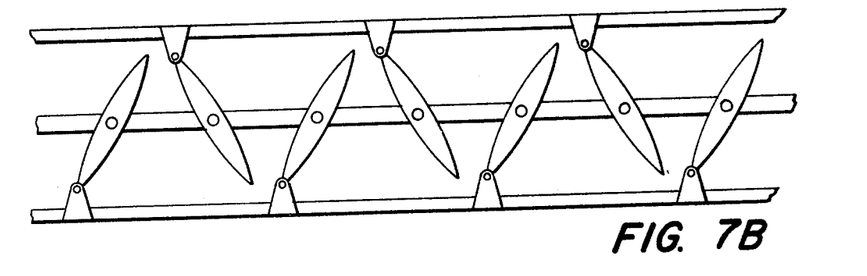
Figure 7C:
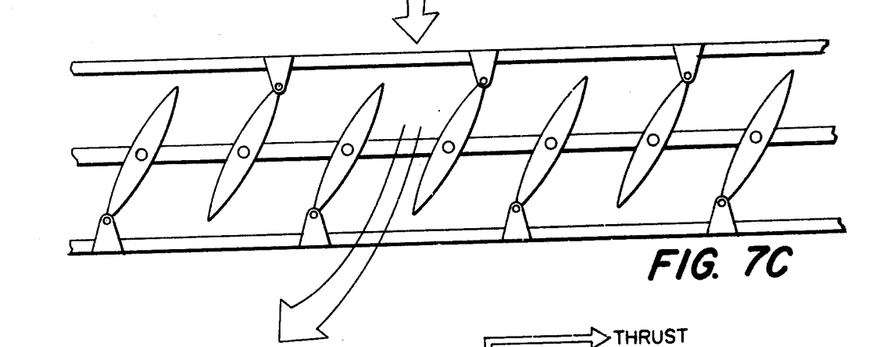

As shown in FIGS. 7a–c, vanes 102a and 102b include arms 122a and 122b on the lower outer edges. The arms are pinned in a movable manner to control members 124a and 124b. Each control member 124a and 124b is responsive to an actuator assembly, which assembly is governed by a control unit as in the preferred embodiment.

Figure 8:
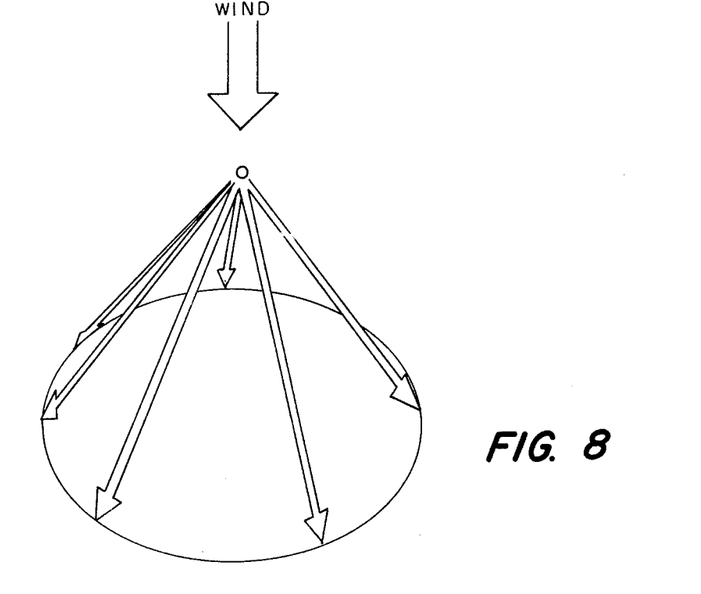
FIG. 8 is a thrust force diagram.

FIGS. 7a–c show several possible positions that the vanes may be made to assume under suitable control actions. In FIG. 7a, the vanes are shown in a position that permits nearly unobstructed passage through the sail of a wind blowing normal to its surface. In FIG. 7b, the vanes are shown in a position that approximately maximizes the force exerted by this same wind on the sail normal to the sail. In FIG. 7c, the vanes are shown in a position that approximately maximizes the component of force exerted by the wind along the horizontal direction lying in the surface of the sail. FIG. 8 shows diagrammatically that the vector representing the force exerted by a wind of a given velocity may be varied within approximately the illustrated limits of the ellipse by a suitable combination of the vane settings illustrated in FIG. 7.

Figure 9:
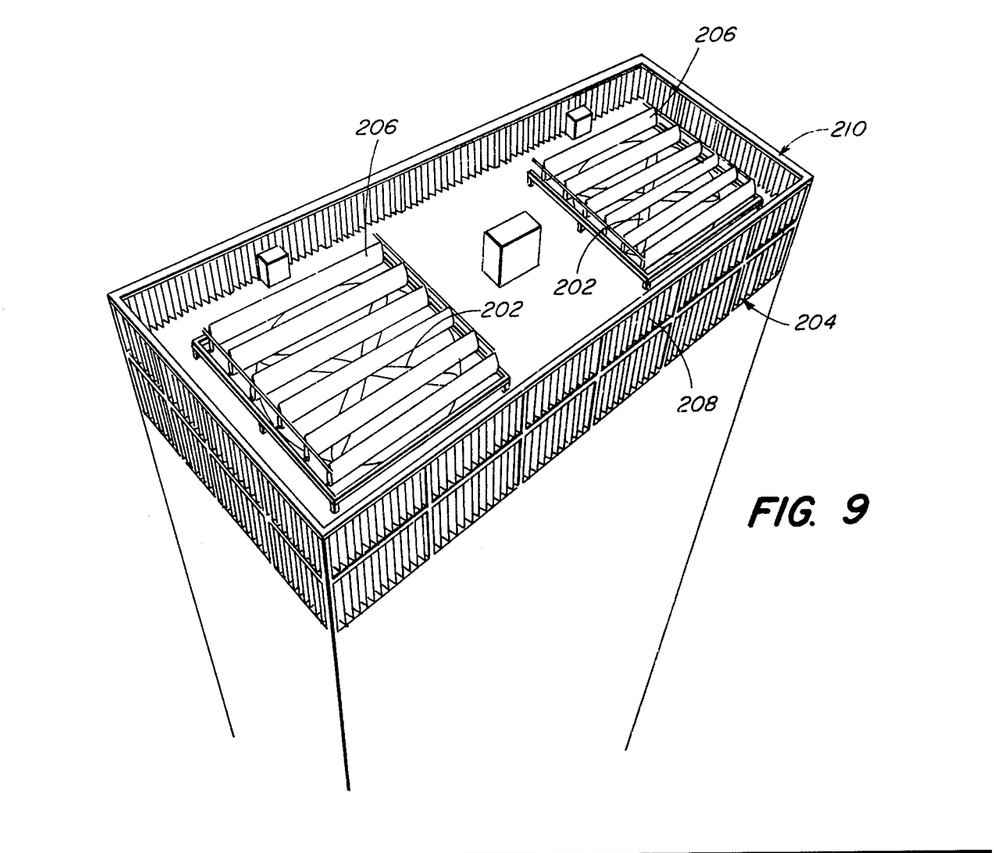
FIG. 9 is a perspective view of the embodiment of FIGS. 1 and 6 combined.

My preferred and alternative embodiments may be advantageously combined. FIG. 9 illustrates one such combination of embodiments wherein the louvers that conventionally admit air to the plenum space beneath fans 202 are supplanted with sails 204 as described in the alternative embodiment. By means of these sails 204, air may be selectively admitted to the plenum space beneath the fans 202, either from the upwind or from the downwind side of the building or at one end of the building or the other, thereby altering the aerodynamic forces exerted by the wind on the building as a whole, and under suitable governance, contributing cooperatively to the forces exerted by vanes 206 such as shown in FIG. 1. Likewise, by suitable governace, the sails may be made to generate forces either along or across the oblong of the roof, or related twistingly to it, at all times in a manner cooperatively to the forces exerted as described for the embodiment of FIG. 1. The sails to 204 enclosing the sides of the plenum chamber may be supplemented by sails 208 set in the parapet 210 above the roof level 214, functioning in the same manner and with the same effect as the sail illustrated in FIGS. 6 and 7.

Figure 10:
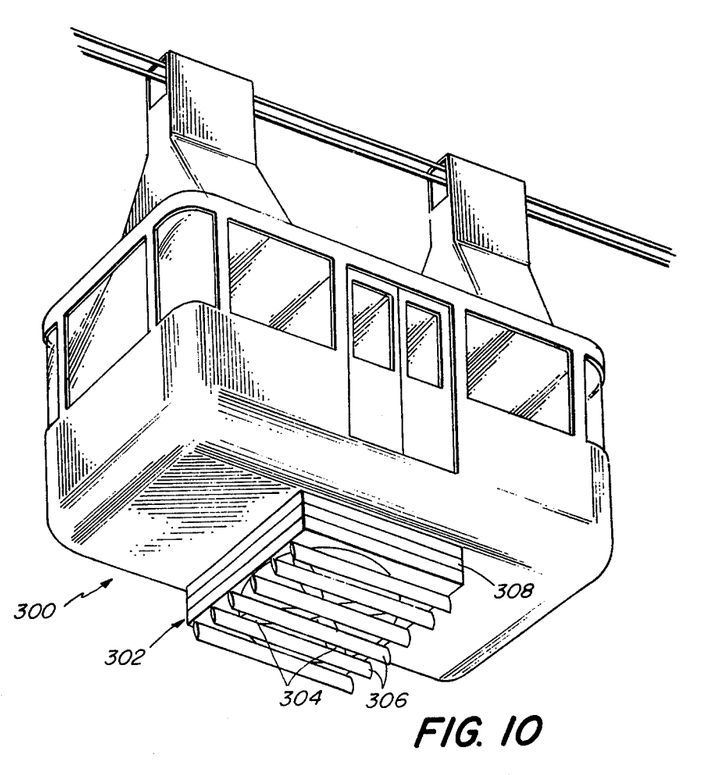
FIG. 10 is a schematic of an embodiment of the invention used with a suspended cable car.

The method and principle of my invention may advantageously be used to control the swaying motion of a suspended structure such as a cable car. Referring to FIG. 10, a cable car 300 includes a plenum chamber 302, a fan 304, vanes 306 and sails 308 mounted in a box-like configuration on the underside of the cable car 300. In operation, the sails and/or vanes generate forces in the same manner as has been described with respect to a swaying building, those forces being so governed and controlled as to oppose at each moment the swaying motion of the cable car in a direction lateral to the suspension cable. Obvious alterations of the arrangement of the same or similar elements may be utilized to counteract pitching motion of the cable car along the direction of the cable or bobbing motion in the vertical direction.

Figure 11:
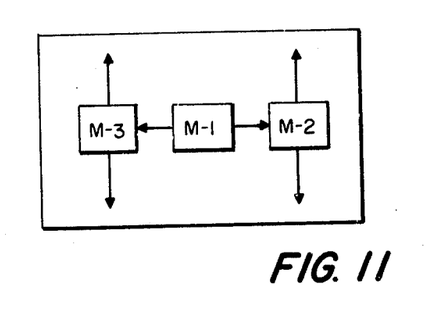
FIG. 11 is a plan view of a further embodiment of the invention used with the dynamic damping concept.

A further element of invention arising from this concept is that of adapting the art of using dynamic dampers of the conventional form by providing, instead of the conventional two dampers operating at right angles to each other, at least three dampers (of no greater total weight) identified in FIG. 11 as M-1, M-2 and M-3, so disposed that two of them, M-2 and M-3, both operate on a crosswise axis but are located at opposite ends of an oblong building. Accordingly, the twisting motion of the building is minimized. Thereby, the dampers M-2 and M-3 may be caused to absorb momentum from the building even during the portion of the time that this momentum is wholly or partly in the twisting mode, a thing not possible with the conventional two-counterweight layout.

The method and principle now having been elucidated, many other embodiments of the same principle will occur to persons skilled in the art. For example, a force of reaction may be generated not only by means of vanes but also by means of directable fans without vanes. Or the desired controllably varying force may be obtained by variable absorption of the momentum of the natural wind by a device operating in the manner of the momentum anemometer (see U.S. Pat. No. 3,848,465) whereby a movement of air from the natural wind is drawn into a honeycomb (or through vanes) by which means the horizontal momentum of the wind is converted into a force in the direction of the wind that is proportional to that momentum and to the rate of inflow into the honeycomb.

The sail has the particular advantage that the forces that it generates for control of motions increases as the wind force itself increases.

For the accelerometer there may be substituted a seismometer that senses the displacement of the building and uses the signal so generated to the same end as the signal from an accelerometer, or there may be used a velocity-sensing device such as might be constructed on the principle of a pendulum having the same fundamental frequency of oscillations as the structure. Many such devices will occur to persons skilled in the art.

Having described my invention, what I now claim is:

1. An apparatus for controlling the motion of a building which motion is caused by winds which comprises:
    (a) a plurality of movable vanes arranged in a sail-like configuration, the vanes adapted to direct an air stream and secured to the building in a movable manner;
    (b) means to sense a linear magnitude arising substantially from translational motion of the building and to provide a signal corresponding to the translational motion; and,
    (c) means to control the movement of the vanes, said means directly responsive to the means to sense whereby when the building moves the translational motion is sensed and the surfaces of the vanes interact with the air to generate a force opposed to the motion of the building.

2. The apparatus of claim 1 wherein the vanes include first and second sets of vanes, each set adapted to be moved independently of the other.

3. The apparatus of claim 2 wherein the vanes of the first and second sets are arranged in alternating relationship.

4. The apparatus of claim 1 wherein the means to sense includes an accelerometer.

5. The apparatus of claim 1 wherein the means to sense includes means to sense a plurality of distinct translational motions to provide outputs corresponding to the same.

6. The apparatus of claim 1 wherein the linear magnitude is representative of the velocity and which includes the means to sense the velocity.

7. The apparatus of cliam 1 wherein the linear magnitude is representative of displacement and which includes a siesmometer to sense said velocity.

8. An apparatus for controlling the motion of a building which motion is caused by winds which comprises:
    (a) means to generate an independent movement of air;
    (b) at least one set of a plurality of vanes disposed substantially normal to the direction of the independent movement of air, and secured to the building;
    (c) means to sense a linear magnitude arising substantially from translational motion of the structure and to provide a signal corresponding to the translational motion; and,
    (d) means to control the movement of the vanes directly responsive to the means to sense whereby when the structure moves the translational motion is sensed and the adjustable surfaces interact with the air and generate a force opposed to the motion of the building.

9. The apparatus of claim 8 wherein the means to sense includes an accelerometer.

10. The apparatus of claim 8 which includes first and second sets of vanes.

11. The apparatus of claim 10 wherein the second set of vanes is substantially normal to the first set and adapted to be operated independently therefrom and both sets of vanes are normal to the independent movement of air.

12. The apparatus of claim 8 wherein the linear magnitude is representative of velocity and which includes means to sense velocity.

13. The apparatus of claim 8 wherein the linear magnitude is representative of displacement and which includes a siesmometer to sense the displacement.

* * * * *